_(12)_ United States Patent
Otsuka (10) Patent No.: US 8,774,268 B2
(45) Date of Patent: Jul. 8, 2014

(54) MOVING IMAGE ENCODING APPARATUS AND METHOD FOR CONTROLLING THE SAME

(75) Inventor: Katsumi Otsuka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1341 days.

(21) Appl. No.: 12/234,004

(22) Filed: Sep. 19, 2008

(65) Prior Publication Data

US 2009/0092186 A1     Apr. 9, 2009

(30) Foreign Application Priority Data

Oct. 4, 2007  (JP) ................................. 2007-261245

(51) Int. Cl.
*H04N 7/26*     (2006.01)

(52) U.S. Cl.
USPC .................................................... 375/240.02

(58) Field of Classification Search
USPC ....................................... 375/240.02, 240.26
See application file for complete search history.

(56) References Cited

U.S. PATENT DOCUMENTS

| 5,661,523 | A | 8/1997 | Yamane |
|---|---|---|---|
| 5,703,646 | A | 12/1997 | Oda |
| 5,949,956 | A | 9/1999 | Fukuda |
| 6,115,421 | A | 9/2000 | Katta et al. |
| 6,173,012 | B1 | 1/2001 | Katta et al. |
| 7,778,350 | B2 * | 8/2010 | Futagi et al. ................. 375/295 |
| 2001/0007435 | A1 * | 7/2001 | Ode et al. ..................... 330/149 |
| 2002/0064232 | A1 | 5/2002 | Fukuhara et al. |
| 2003/0031259 | A1 | 2/2003 | Youn et al. |
| 2004/0179591 | A1 * | 9/2004 | Wenger et al. ........... 375/240.01 |
| 2005/0036698 | A1 * | 2/2005 | Beom ........................... 382/239 |
| 2005/0047509 | A1 * | 3/2005 | Lee et al. ................. 375/240.19 |

FOREIGN PATENT DOCUMENTS

| JP | 09-294267 A | 11/1997 |
|---|---|---|
| JP | 3112035 B | 11/2000 |
| JP | 3265818 B | 3/2002 |
| JP | 3268306 B | 3/2002 |
| JP | 3358620 B | 12/2002 |
| JP | 2003-061051 A | 2/2003 |

OTHER PUBLICATIONS

U.S. Appl. No. 12/234,036, filed Sep. 19, 2008, Katsumi Otsuka.
The above references were cited in a Sep. 28, 2011 US Office Action that issued in related U.S. Appl. No. 12/234,036.

* cited by examiner

*Primary Examiner* — Gilberto Barron, Jr.
*Assistant Examiner* — David Le
(74) *Attorney, Agent, or Firm* — Cowan, Liebowitz & Latman, P.C.

(57) ABSTRACT

The invention generates encoded data that properly conforms to pre-specified image quality and suppresses a large change in image quality. An encoding unit encodes pictures block by block according to a parameter. A distortion amount calculation unit calculates a picture distortion amount between a decoded picture and a picture before being encoded. A scene distortion amount calculation unit calculates a scene encoding distortion amount from the picture distortion amounts of a plurality of pictures having been encoded. A distortion bit rate conversion unit calculates a corrected bit rate by calculating a difference between a target distortion amount and the calculated scene encoding distortion amount, and multiplying the calculated difference by a coefficient. A target bit rate calculation unit calculates a bit rate for a picture subsequent to a picture of interest by adding a current target bit rate to the corrected bit rate, and sets it as the parameter.

7 Claims, 9 Drawing Sheets

| TARGET IMAGE QUALITY | TARGET BLOCK DISTORTION AMOUNT |
|---|---|
| LOW IMAGE QUALITY | 15,000 |
| NORMAL IMAGE QUALITY | 10,000 |
| HIGH IMAGE QUALITY | 7,000 |
| ULTRA-HIGH IMAGE QUALITY | 5,000 |

MOVING IMAGE ENCODING APPARATUS AND METHOD FOR CONTROLLING THE SAME

BACKGROUND OF THE INVENTION

1. Field of the Invention

The present invention relates to a real time variable bit rate encoding technique.

2. Description of the Related Art

Recent significant advances in digital signal processing technology have enabled recording of moving images on storage media and transfer of moving images through transmission lines, which were difficult to achieve with conventional technology. For this, the respective pictures that constitute a moving image are compression-encoded to significantly reduce its data amount. As a typical method of this compression encoding process, there is, for example, MPEG (Moving Picture Experts Group) scheme.

When a series of pictures are compression-encoded in accordance with the MPEG scheme with the condition of a constant bit rate, the encoded data amount differs significantly depending on a scene made up of a plurality of pictures, spatial frequency characteristics of pictures, the correlation between pictures, and the quantizer scale value. Encoded data amount control is an important technique for minimizing encoding distortion when achieving an apparatus that has such encoding characteristics.

Algorithms for realizing the encoded data amount control can be roughly classified into two types: constant bit rate encoding scheme (hereinafter referred to as "CBR scheme") and variable bit rate encoding scheme (hereinafter referred to as "VBR scheme"). Ordinarily, the VBR scheme is known to provide decoded pictures of better image quality than the CBR scheme because the VBR scheme assigns codes adaptively depending on the encoding difficulty. The adaptive assignment of codes is realized by, for example, assigning a high bit rate to a scene with a high difficulty level of encoding and assigning a low bit rate to a scene with a low difficulty level of encoding.

Figure 2:
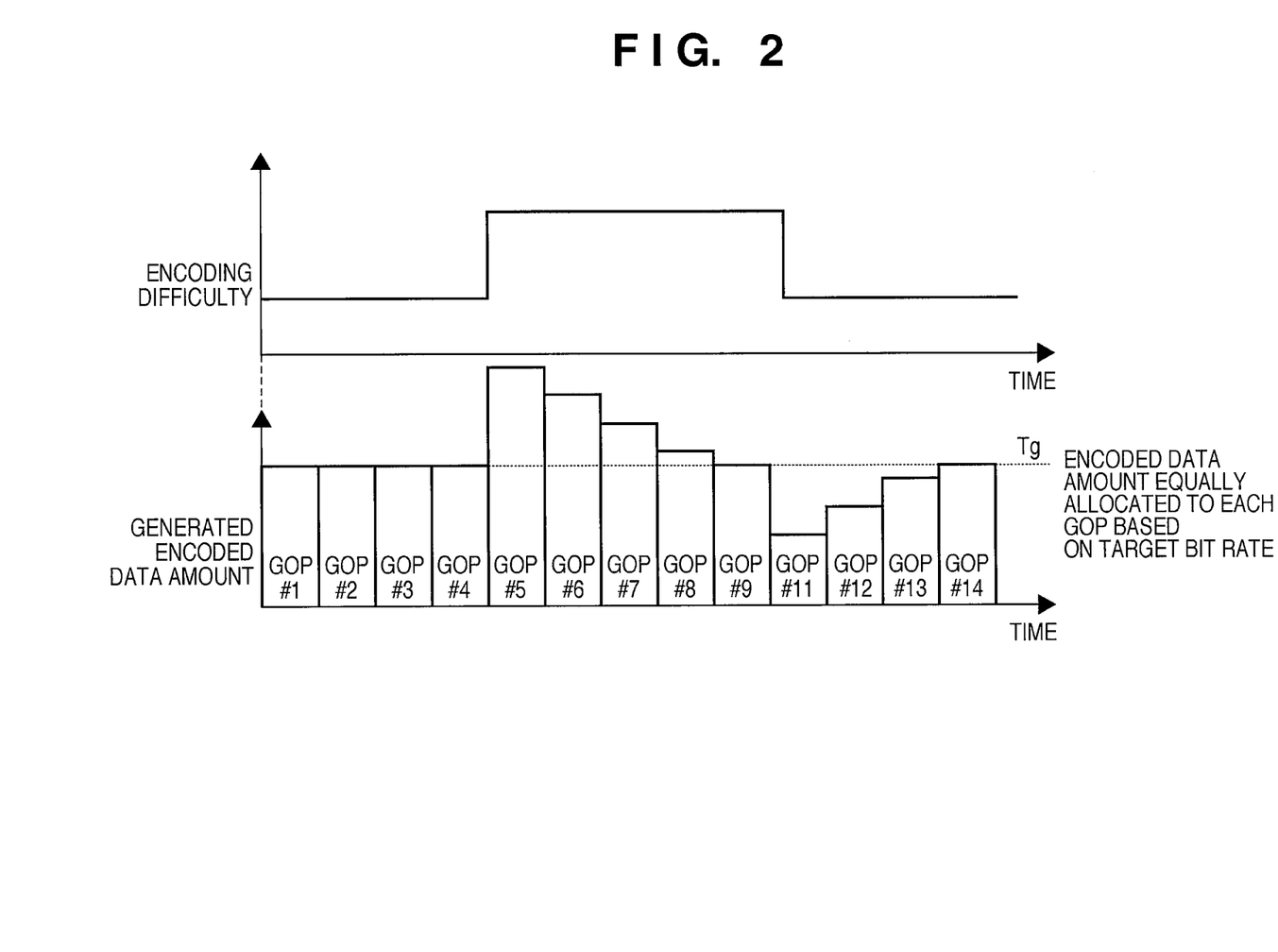
FIG. 2 is a diagram used to illustrate a conventional technique.

Japanese Patent Laid-Open No. H9-294267 (hereinafter referred to as "Document 1") attempts to improve image quality with the VBR scheme by solving the problems encountered with the CBR scheme. In the CBR scheme, if the encoded data amount that is generated in a GOP (Group Of Pictures) is excessively greater than the target encoded data amount of the GOP, the next target encoded data amount tries to absorb this surplus, resulting in the problem of image quality degradation. FIG. 2 shows a transition in encoded data amount generated on a GOP-by-GOP basis according to the VBR scheme of Document 1. In FIG. 2, #n (n=1, 2, . . . ) indicates the order of the GOPs.

It can be seen from FIG. 2 that the generated encoded data amount increased largely in GOP#5 because GOP#5 has a high difficulty level of encoding, and the generated encoded data amount decreased gradually from GOP#6 to GOP#9. In order to achieve such a gradual decrease in encoded data amount generated in GOPs, a target encoded data amount R(j) of GOP#j (the jth GOP) is determined using the following equations.

$$\text{DIFF}(j) = \text{DIFF}(j-1) + B(j-1) - Tg \quad (1)$$

$$R(j) = Tg - (1/T) \times \text{DIFF}(j) \quad (2)$$

In the equations, B(j) represents an encoded data amount generated in GOP#j (the jth GOP), Tg represents a target encoded data amount equally allocated to each GOP based on a given target bit rate, and T is a constant equal to or greater than 2.

As is obvious from the equations (1) and (2), the target encoded data amount R(j) is determined according to DIFF(j) that is the cumulation of the encoded data amounts generated in GOPs in the past. However, the following problem still remains in Document 1.

When determining a target encoded data amount R(j) for a GOP to be encoded, it cannot be determined as appropriate according to the difficulty level of encoding because reference is made only to the encoded data amounts generated in the already encoded GOPs, namely, the zeroth to the (j−1)th GOPs. Furthermore, in Document 1, focus is given on the target encoded data amounts of GOPs after the occurrence of the large increase in the generated encoded data amount, and merely the encoded data amount is caused to decrease gradually. The image quality degradation of decoded pictures are improved locally as compared to the CBR scheme, but it is difficult to maintain the image quality to a desired level.

Figure 3:
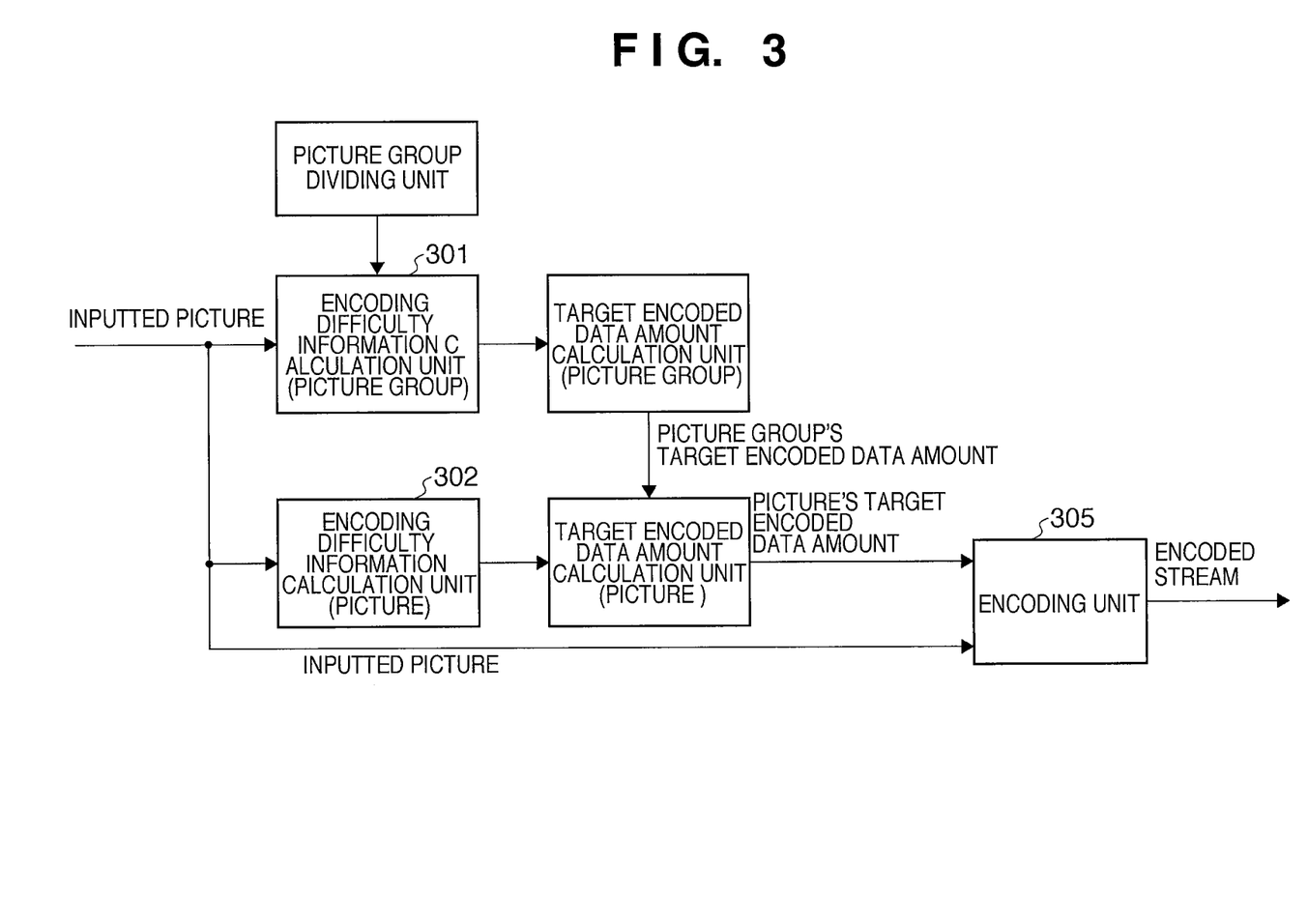
FIG. 3 is a schematic configuration diagram of an apparatus according to a conventional technique.

Next, an encoding apparatus according to Japanese Patent Laid-Open No. 2003-61051 (hereinafter referred to as "Document 2") will be discussed. FIG. 3 is a schematic configuration diagram of an apparatus disclosed in Document 2. According to this Document 2, a feedforward type VBR scheme is achieved by performing detection on a picture group made up of a plurality of pictures and a picture to be encoded using a means for detecting difficulty level of encoding, called "encoding difficulty information calculation units 301 and 302" in Document 2. However, even in Document 2, the following problem still remains.

The encoding difficulty information calculation units 301 and 302 require an encoding means similar to an encoding unit 305, and therefore the processing load is very heavy. Furthermore, Document 2 discloses the use of spatial activity to determine a difficulty level of encoding, but the use of spatial activity is insufficient to predict a difficulty level of encoding in the encoding unit 305, and therefore it is difficult to use special activity as information for maintaining image quality to a desired level.

SUMMARY OF THE INVENTION

The present invention has been conceived in light of the above problems, and the present invention provides a technique for generating an encoded stream that satisfies prespecified image quality without depending on a sequence and performing encoding at the minimum bit rate that satisfies the specified image quality.

In order to solve the problems, a moving image encoding apparatus of the present invention is configured as follows. Specifically, a moving image encoding apparatus that encodes pictures that are continuously inputted, the apparatus including: an encoding unit adapted to encode the inputted pictures block by block according to a given encoding parameter to generate encoded data, the block being configured of a plurality of pixels; a decoding unit adapted to decode encoded data obtained from a picture of interest; a distortion amount calculation unit adapted to calculate a difference in a boundary position between the blocks between a picture obtained through decoding by the decoding unit and a picture before being encoded as a picture distortion amount; a scene encoding distortion amount calculation unit adapted to calculate a scene encoding distortion amount from the picture distortion amounts of a preset plurality of pictures that have been previously encoded; a setting unit adapted to set an association between a scene encoding distortion amount and an image quality level that is determined in advance; an encoding distortion bit rate conversion unit adapted to calculate a corrected bit rate by calculating a difference between a preset target distortion amount and the scene encoding distortion amount calculated by the scene encoding distortion amount calculation unit, and multiplying the calculated difference by an encoding distortion bit rate conversion coefficient; and a target bit rate calculation unit adapted to calculate a target bit rate for a picture subsequent to the picture of interest by adding a current target bit rate to the corrected bit rate calculated by the encoding distortion bit rate conversion unit, and set the calculated target bit rate as the encoding parameter for the encoding unit.

According to the present invention, it is possible to generate encoded data that properly conforms to pre-specified image quality by measuring image quality of currently encoded data from a scene encoding distortion amount and a target encoding distortion amount, and calculating a target bit rate. It is also possible to suppress a large change in image quality by calculating scene encoding distortion amounts for a plurality of pictures that have been encoded previously from distortion amounts of the plurality of pictures.

Further features of the present invention will become apparent from the following description of exemplary embodiments with reference to the attached drawings.

DESCRIPTION OF THE EMBODIMENTS

Hereinafter, embodiments of the present invention will be described in detail with reference to the accompanying drawings.

[First Embodiment]

Figure 1:
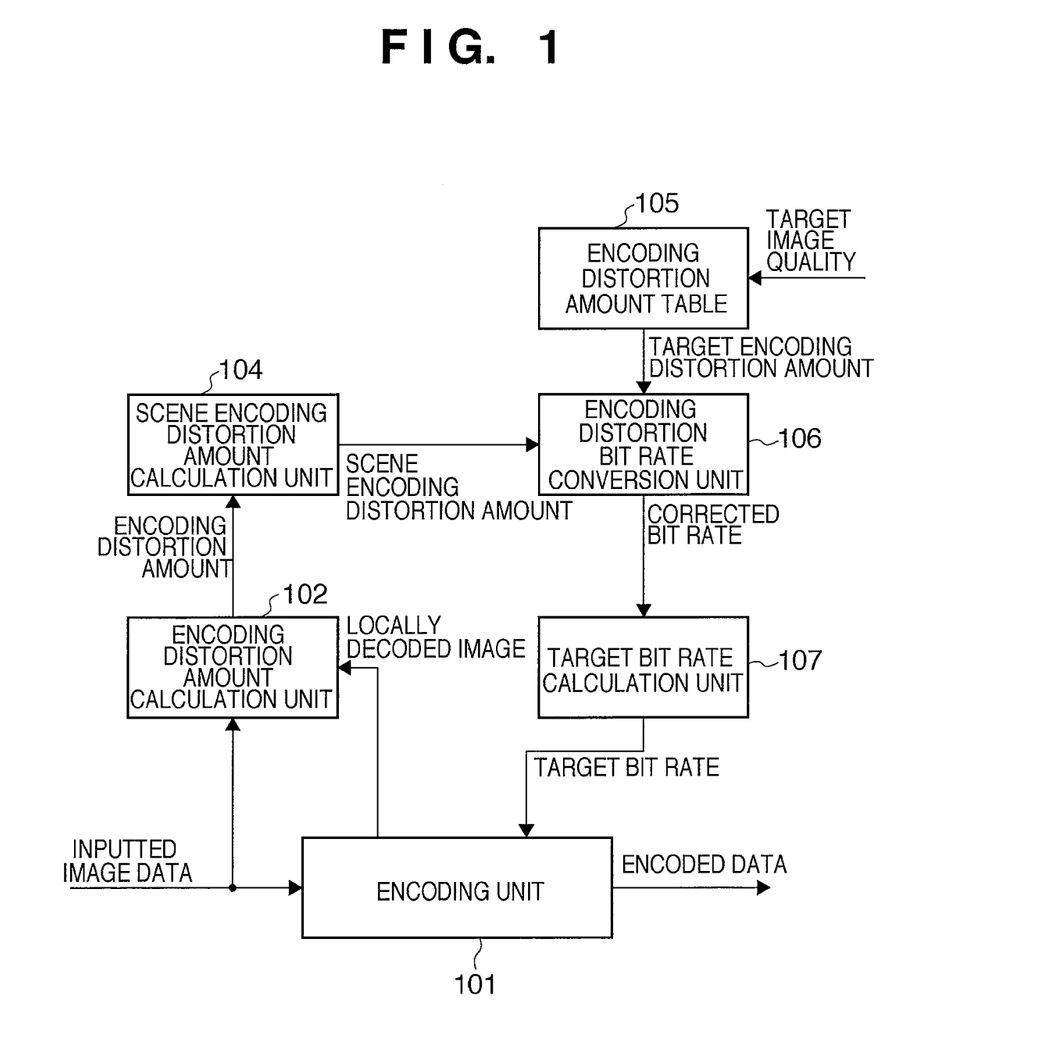
FIG. 1 is a block configuration diagram of a moving image encoding apparatus according to first embodiment.

FIG. 1 is a block configuration diagram of a moving image encoding apparatus according to the present embodiment that encodes pictures that are continuously inputted. A process performed by this moving image encoding apparatus will be described below.

An encoding unit 101 encodes inputted image data and outputs the encoded data at a given target bit rate. The encoding unit 101 employs, as the encoding scheme, for example, a moving image encoding scheme that performs inter-frame prediction, such as MPEG-1/-2/-4 or H.264. Because the encoding unit 101 employs a moving image encoding scheme that performs inter-frame prediction, it also outputs a locally decoded image at the same time when it outputs the encoded data. Encoding techniques, such as MPEG-1/-2/-4 and H.264, are encoding schemes according to ISO recommendations and are well known. Thus, descriptions thereof are omitted here. The encoding unit 101 performs encoding block by block, each of which includes a plurality of pixels. In the present embodiment, each block has a size of 8 pixels by 8 pixels.

An encoding distortion calculation unit 102 calculates an encoding distortion amount based on the locally decoded image of a picture of interest that is inputted from the encoding unit 101 and its corresponding input image that has been inputted to the encoding unit 101 (i.e., the picture of interest before being encoded). In the present embodiment, as the encoding distortion amount, a block distortion amount is calculated which is believed to cause the most visually perceptible degradation. A procedure for calculating the block distortion amount will be described next.

The number of pixels in the horizontal direction of an image that is inputted by the encoding unit 101 is set to x_size, and the number of pixels in the vertical direction is set to y_size. If the coordinate in the horizontal direction is denoted by J, and the coordinate in the vertical direction is denoted by I, the pixel value of the inputted image is expressed by CIN (J,I). Similarly, the pixel value of the locally decoded block image is expressed by COUT(J,I) In the present embodiment, a block distortion amount Bc is determined by using the following algorithm.

```
for (I=0;I < y_size -1; I++){                                    (3)
   for (J= 0; J < x_size -1; J++){
      if (J % 8 == 7){
         EDGEin      = ABS (CIN(J,I)–CIN(J,I+1));
         EDGEout     =ABS (COUT(J,I) – COUT(J,I+1));
         MSEblk ++   = POWER(EDGEin – EDGEout));}
      else{
         if( I % 8 == 7){
         EDGEin      = ABS(CIN(J,I) – CIN(J+1,I));
         EDGEout     =ABS(COUT(J,I) – COUT(J+1,I));
         MSEblk++    = POWER(EDGEin –EDGEout));}
}}
Bc= MSEblk/MSEall;
```

In the above, MSEall represents the sum of squared differences between CIN(J,I) and COUT(J,I) in an entire picture. Likewise, "X % Y" represents a function that returns a remainder that is obtained when dividing an integer X by an integer Y. Furthermore, because the block distortion amount Bc is calculated by referring to only the pixel values of pixels that are located on the boundary between blocks, 6 pixels by 6 pixels that are located inside the block boundary are not referred. It is for this reason that the encoding unit 101 decodes the pixel values of pixels that are located locally, that is, on the boundary of a block, as described earlier.

The above algorithm is now described briefly. As explained earlier, the position of the block boundary is a coordinate position corresponding to an integral multiple of 8 both in the horizontal and vertical directions of an image. Ordinarily, the coordinates of the upper left corner of an image are expressed by the origin (0,0), and thus the coordinate position of a pixel that is located on the boundary between two adjacent blocks is represented by a coordinate that has a remainder of 7 when the coordinate is divided by 8, and that coordinate +1. According to the above algorithm, the difference between the difference between two pixels that are located on the boundary between two blocks in an original image (before being encoded) and the difference between two pixels that are located on the block boundary after being decoded is an index value that represents the distortion between two adjacent blocks. As adjacent blocks, there are two types: those in the horizontal direction and those in the vertical direction. Therefore, by cumulating respective distortion values, the block distortion amount Bc of a whole image can be calculated. In other words, this block distortion amount Bc is an index value that represents the picture distortion amount of a picture of interest after being encoded.

Accordingly, if the block distortion amount Bc is large, it is obvious that the decoded image is significantly degraded in image quality relative to the original image, and the encoding distortion is large. In the present embodiment, the block distortion is determined with the coordinates corresponding to an integral multiple of 8, but if the block size is other than a size of 8 pixels by 8 pixels, the block distortion can be determined accordingly.

Figure 4:
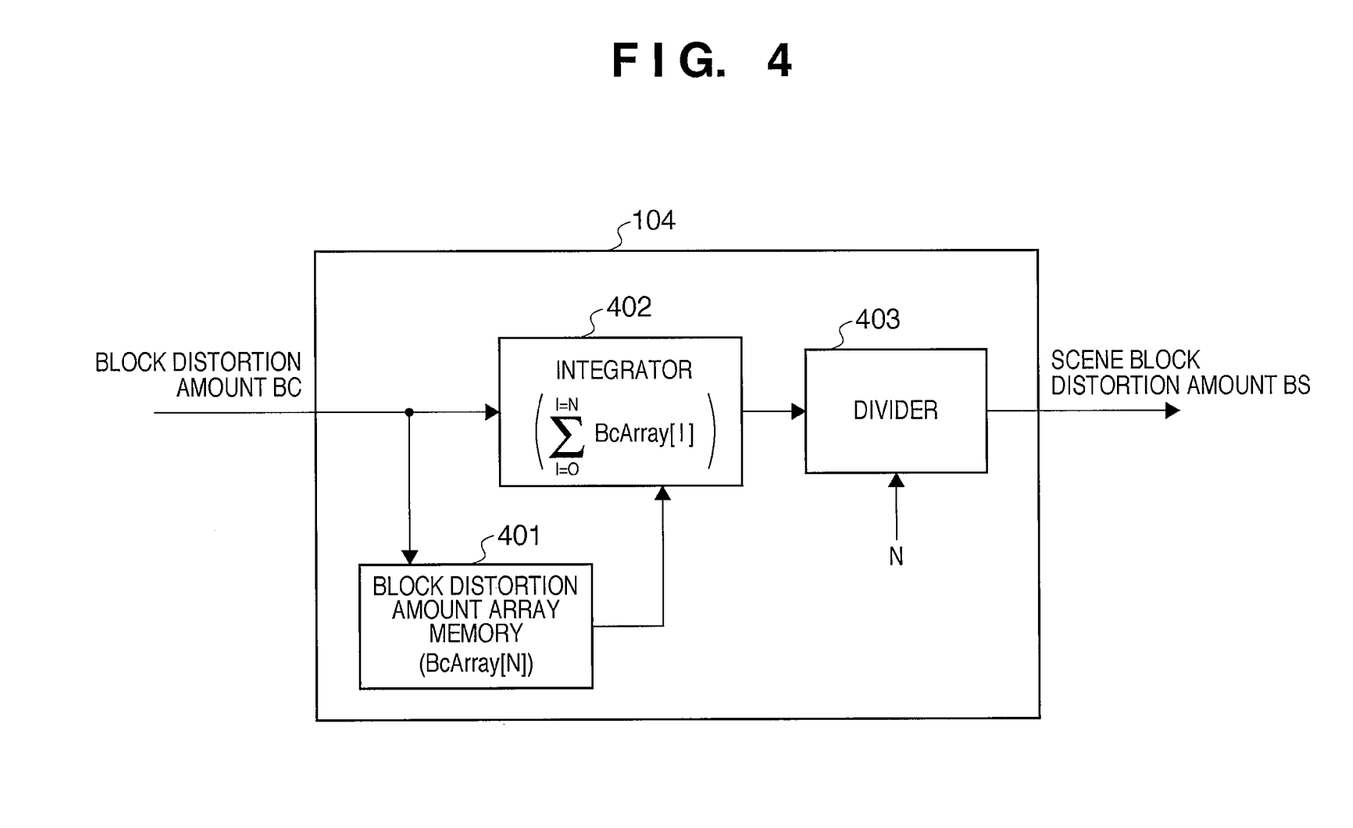
FIG. 4 is a block configuration diagram of a scene block distortion amount calculation unit according to an embodiment.

Next, the configuration of a scene encoding distortion amount calculation unit 104 is shown in FIG. 4, and a process performed by the scene encoding distortion amount calculation unit 104 will be described.

The block distortion amount Bc is saved in a block distortion amount array memory 401 as BcArray[N] (where N is an integer equal to or greater than 1). The value of N corresponds to the period at which what is called I picture, which is encoded by inter-frame prediction, appears. Here, N is set to 15 (N=15). In other words, the block distortion amount array memory 401 stores the block distortion amount Bc of 15 pictures that precede a picture of interest. An integrator 402 calculates the total of the block distortion amounts Bc of N images that precede the picture of interest. A divider 403 calculates the average of the total of the block distortion amounts Bc of N images, and outputs the obtained average as a scene block distortion amount Bs. In short, this scene block distortion amount Bs is the average of the block distortion amount Bc of 15 frames.

Figure 9:
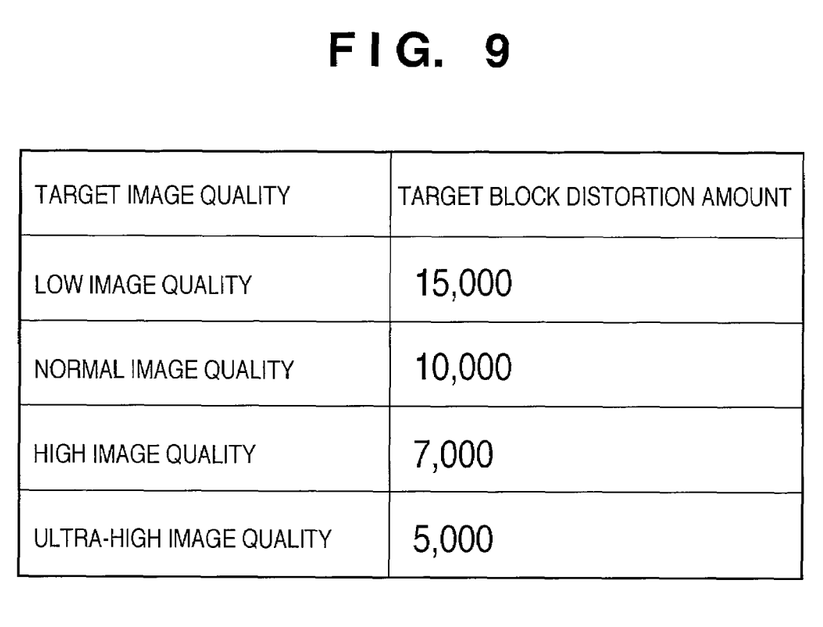
FIG. 9 is a diagram illustrating an example of data that is stored in a block distortion amount table according to an embodiment.

Next, the configuration of an encoding distortion amount table 105 is shown in FIG. 9. The encoding distortion amount table 105 is configured of a writable memory, and can be revised as appropriate through the operation of an operation unit (not shown) by the user. The encoding distortion amount table 105 according to the present embodiment stores information in which the relationship between the block distortion amount Bc that is calculated by the encoding distortion amount calculation unit 102 and target image quality is written in advance. In FIG. 9, four image quality modes (image quality levels) ranging from low image quality to ultra-high image quality are provided as the target image quality, and the relationship between the image quality modes and the values of the block distortion amounts Bc that correspond to the respective image quality modes is defined. Before the encoding apparatus of the present invention is activated, an image quality mode that is selected from the four image quality modes is specified in the encoding distortion amount table 105. The encoding distortion amount table 105 outputs the value of the target block distortion amount that corresponds to the specified image quality mode to an encoding distortion bit rate conversion unit.

Figure 5:
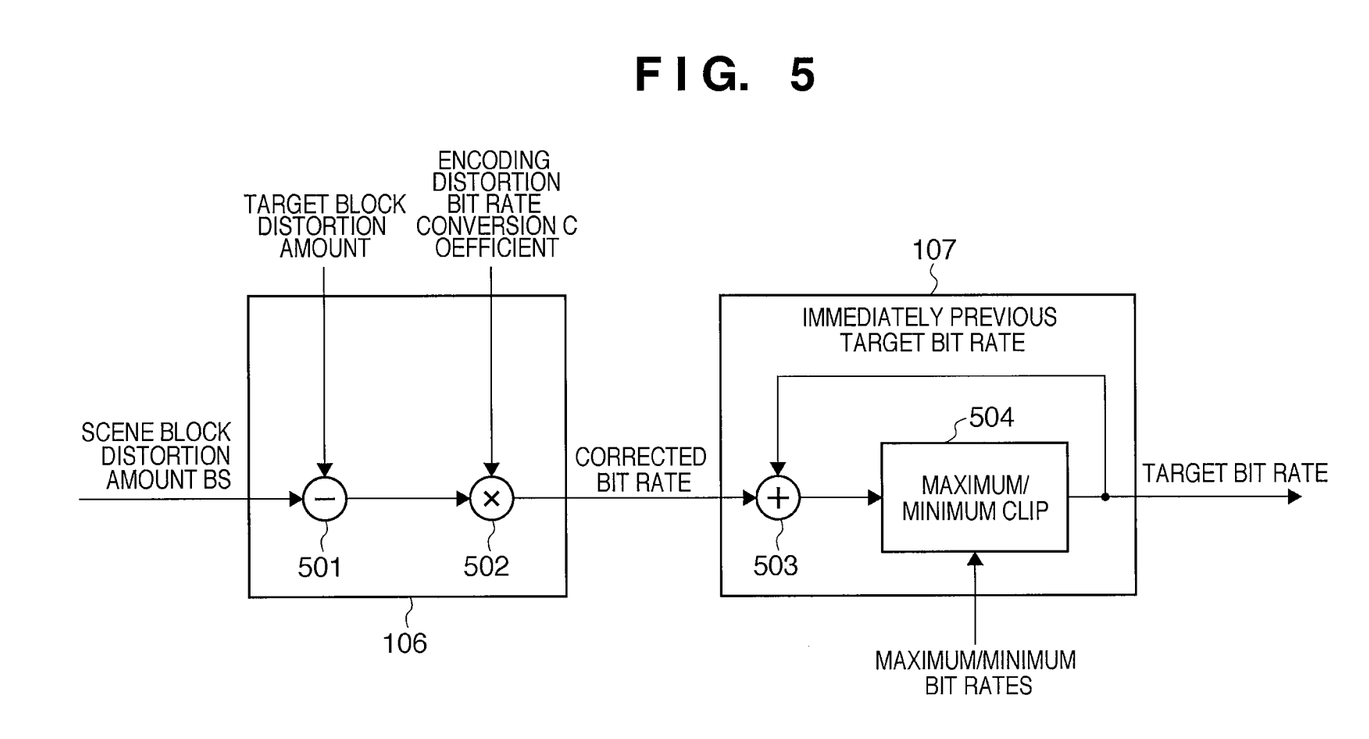
FIG. 5 is a block diagram illustrating the configuration of an encoding distortion bit rate conversion unit and a target bit rate calculation unit according to an embodiment.

Next, the configuration of the encoding distortion bit rate conversion unit 106 and a target bit rate calculation unit 107 is shown in FIG. 5, and a process performed by these units will be described below.

A subtractor 501 of the encoding distortion bit rate conversion unit 106 calculates the difference between the scene block distortion amount Bs that is inputted from the scene encoding distortion amount calculation unit 104 and the target block distortion amount that is inputted from the block distortion amount table 105, and outputs the result to a multiplier 502. This difference operation is equivalent to obtaining the difference between the image quality of the currently encoded data in the encoding unit 101 and an image quality that is targeted from the block distortion amount that serves as an index that represents image quality. The multiplier 502 multiplies the block distortion amount difference obtained from the subtractor 501 by a preset encoding distortion bit rate conversion coefficient so as to convert the unit of the difference value from the block distortion amount into bit rate (bit per second). The converted bit rate value is outputted to the target bit rate calculation unit 107 as a corrected bit rate.

An adder 503 of the target bit rate calculation unit 107 adds the immediately previous target bit rate to the corrected bit rate that has been inputted, and outputs the result of the addition to a clipping unit 504. The clipping unit 504 clips the addition result obtained from the adder 503 to within a range defined by preset maximum and minimum bit rates that have been set in advance before the encoding apparatus of the present embodiment is activated, and outputs the result to the encoding unit 101 as a target bit rate (encoding parameter). It should be noted that when encoding is performed on the first 15 frames to be encoded, because no frame precedes the first 15 frames, the scene block distortion amount Bs cannot be calculated. Accordingly, a target bit rate set by default is used when encoding the first 15 frames.

The encoding unit 101 internally determines a quantization step, which is used for encoding, according to the set target bit rate, and performs encoding. It is also possible to employ a configuration in which the target bit rate calculation unit 107 possesses an association table in which the calculated target bit rate and quantization step are associated with each other, determines a quantization step by referring to the table, and outputs the quantization step to the encoding unit 101.

Figure 6:
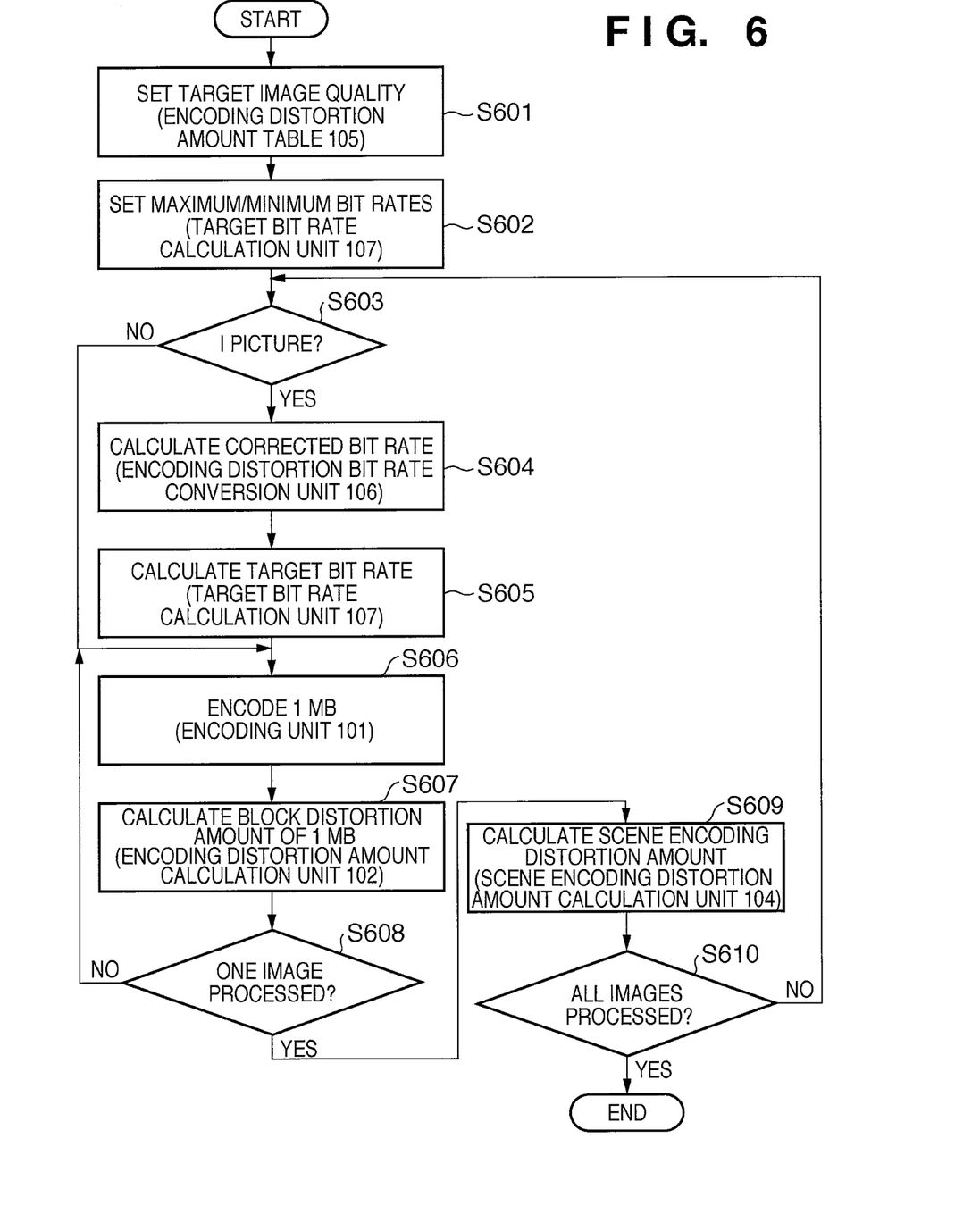
FIG. 6 is a flowchart illustrating a processing procedure according to first embodiment.

A processing procedure of the encoding process according to the present embodiment will be described next with reference to the flowchart of FIG. 6.

In steps S601 and S602, target image quality and the maximum and minimum bit rates are set before the encoding apparatus of the present embodiment starts encoding operation. In the present embodiment, these settings are made through an operation unit (not shown), but the settings may be made by loading a single settings file from a memory in which some settings files are stored in advance in accordance with an instruction from the user.

A target bit rate serving as an encoding parameter that is provided to the encoding unit 101 is set each time an I-type picture is encoded. That is, in the case of a P-type or B-type picture, the target bit rate that has been set for the I-type picture processed immediately therebefore is used. This determination is made in step S603. In the present embodiment, an I picture appears every 15 frames. Accordingly, in step S603, Yes is determined only every 15 frames. The number of frames is set to 15 here, but this is only an example, and of course the number of frames can be set as appropriate.

In steps S604 and S605, a target bit rate is calculated for a picture subsequent to the picture of interest by the encoding distortion bit rate conversion unit 106 and the target bit rate calculation unit 107 as explained earlier.

In steps S606 and S607, the encoding unit 101 performs encoding on an inputted image, and at the same time, the encoding distortion amount calculation unit 102 calculates a block distortion amount. These steps S606 and S607 can be realized by processing all of the macroblocks (MBs) within a screen by performing processing MB by MB in an image. In this case, the formula (3) that is a process of the encoding distortion amount calculation unit 102 is implemented by setting x_size and y_size, which are constants of the formula (3), to the size of the MB.

If it is determined in step S608 that all of the MBs included in a single screen (single frame) have been processed in steps S606 and S607, the scene encoding distortion amount calculation unit 104, in step S609, receives an input of block distortion amount Bc from the encoding distortion amount calculation unit 102, and calculates a scene encoding distortion amount Bs. Then, the process proceeds to step S610 to determine whether or not process for all inputted images is completed.

By repeating these processes for all inputted images, encoded data that satisfies the target image quality set in step S602 is generated from the encoding unit 101.

Figure 7:
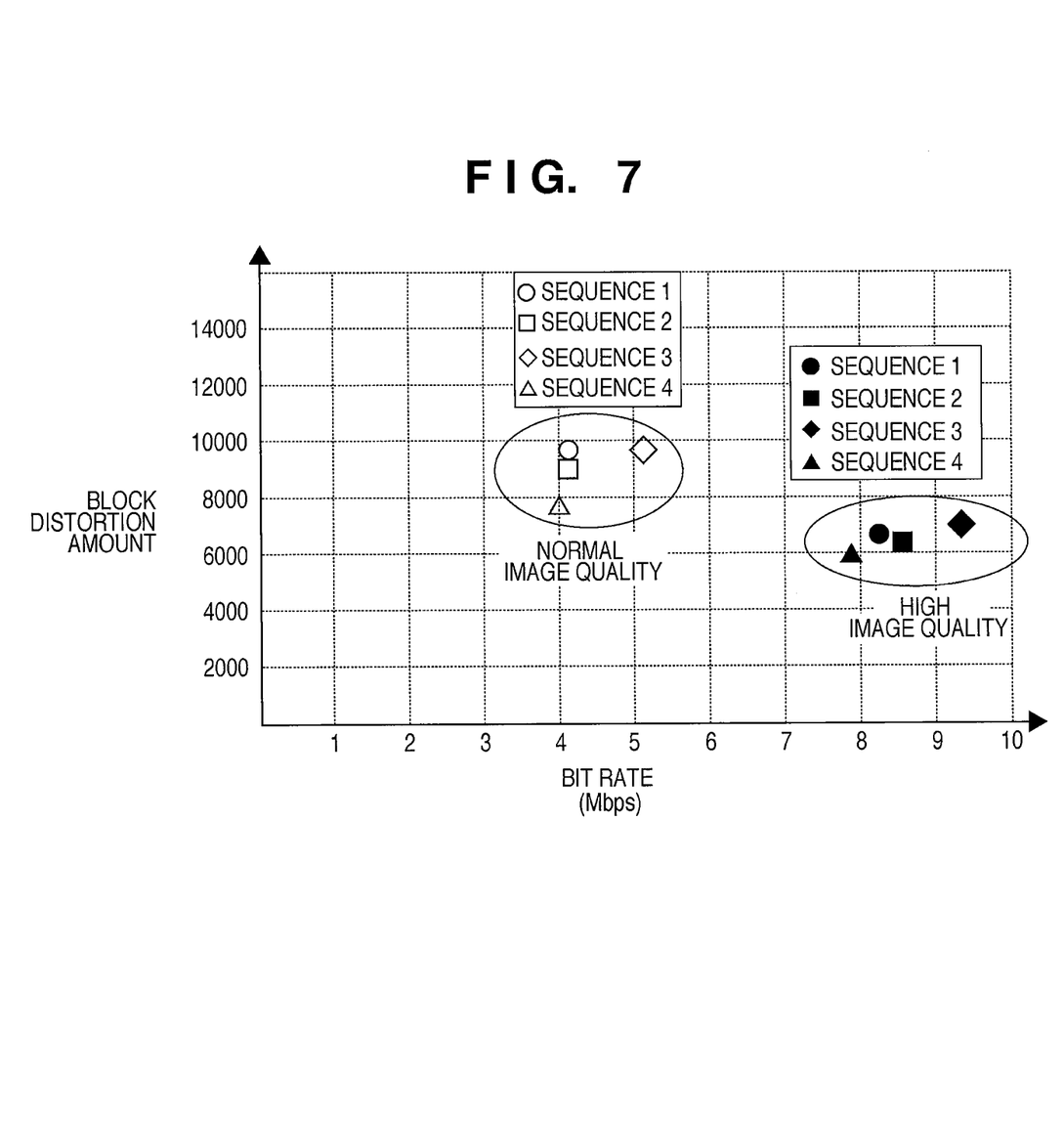
FIG. 7 is a graph in which image quality measurement results according to first embodiment are plotted.

In FIG. 7, the results that are obtained by measuring the image quality of encoded data provided according to the present embodiment, where the MPEG-4 encoding scheme is applied to the encoding unit 101, are shown. As input image data to be encoded, four different types of sequences 1 to 4 were used. Then, encoded data was generated separately for each sequence. As the target image quality, normal image quality and high image quality modes (image quality levels) shown in FIG. 9 were set. Eight encoded data items were generated in total, and the average bit rate and average of block distortion amount of each generated encoded data item were plotted. In this manner, FIG. 7 was obtained. It can be seen from FIG. 7 that the generated encoded data items satisfy the predetermined image quality.

[Second Embodiment]

Figure 8:
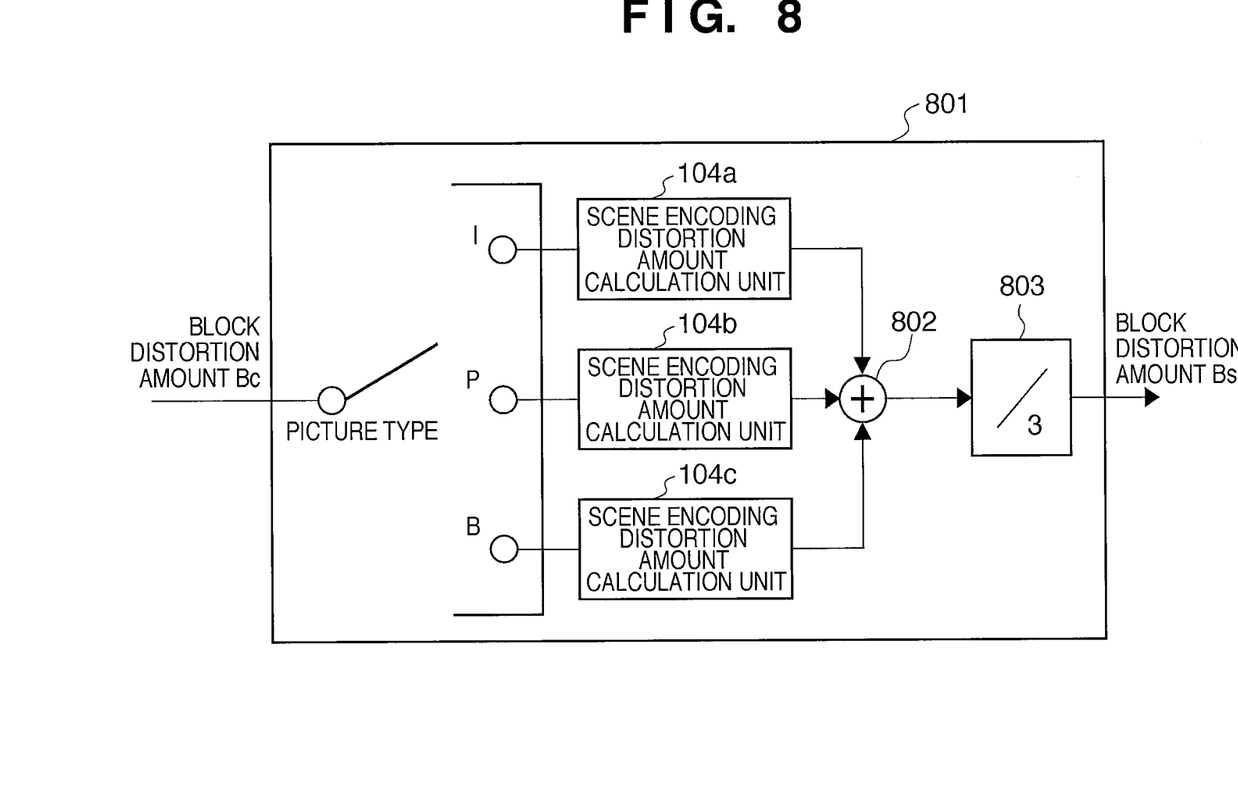
FIG. 8 is a block configuration diagram of a scene block distortion amount calculation unit according to second embodiment.

Second embodiment employs a configuration in which a scene block distortion amount is calculated for each picture type in the scene encoding distortion amount calculation unit 104 shown in the block diagram of first embodiment given above. FIG. 8 shows the configuration of a scene encoding distortion amount calculation unit 801 according to this second embodiment that replaces the scene encoding distortion amount calculation unit 104 shown in FIG. 1. Other configurations are the same as those of FIG. 1. In the scene encoding distortion amount calculation unit 801, scene encoding distortion amount calculation units 104a to 104c corresponding to three picture types, respectively, which serve as an equivalent to the scene encoding distortion amount calculation unit 104 of FIG. 1, are arranged in parallel. Upon receiving an input of a block distortion amount from the encoding distortion amount calculation unit 102, a scene encoding distortion amount calculation unit is selected according to the picture type so as to calculate a scene encoding distortion amount for each picture type. In an adder 802 and a divider 803, the average of the scene block distortion amounts of three picture types is calculated, and is outputted as a scene block distortion amount Bs.

According to the above configuration, in addition to the effects of first embodiment, fine encoded data amount control can be performed for I, P and B pictures of a GOP.

The embodiments of the present invention have been described above. However, in the present invention, a process that corresponds to each embodiment given above may be realized by a general-purpose information processing apparatus such as a personal computer and a computer program that is stored in a storage medium and is executed by the apparatus. In this case, a configuration is conceivable in which moving image data to be encoded is stored in the form of a file in a storage medium or storage apparatus (e.g., hard disk), the data is encoded and then stored in the storage medium or storage apparatus. In the case of realizing the process with a computer program, the constituent elements shown in FIG. 1 can function as a subroutine, function or procedure of the computer program, and execute the main process according to the flowchart shown in FIG. 6. In this case, program code itself that is loaded from the storage medium realizes the functions of the above-described embodiment, and the storage medium that stores the program code falls within the scope of the present invention.

Ordinarily, a computer program is stored in a computer-readable storage medium such as a CD-ROM, and the computer program can be executed by inserting the storage medium into a reading device (a CD-ROM drive, etc.) of a computer and copying or installing it on the system of the computer. Accordingly, it is clear that the computer-readable storage medium also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-261245, filed on Oct. 4, 2007, which is hereby incorporated by reference herein in its entirety.

What is claimed is:

1. A moving image encoding apparatus that encodes pictures that are continuously inputted, the apparatus comprising:
    an encoding unit which encodes the inputted pictures block by block according to a given encoding parameter to generate encoded data, the block being configured of a plurality of pixels;
    a decoding unit which decodes encoded data obtained from a picture of interest;
    a distortion amount calculation unit which calculates a difference in a boundary position between the blocks between a picture obtained through decoding by the decoding unit and a picture before being encoded as a picture distortion amount;
    a scene encoding distortion amount calculation unit which calculates a scene encoding distortion amount for a group of pictures (GOP) from the picture distortion amounts of pictures in the GOP that includes at least one intra-picture and has been previously encoded;
    a setting unit which sets a target distortion amount based on an image quality level that is designated by that a user operates a predetermined operation unit and information in which the relationship between the target distortion amount and the image quality level is described as a target image quality;
    an encoding distortion bit rate conversion unit which calculates a corrected bit rate by calculating a difference between the target distortion amount set by said setting unit and the scene encoding distortion amount calculated by the scene encoding distortion amount calculation unit, and multiplying the calculated difference by an encoding distortion bit rate conversion coefficient; and
    a target bit rate calculation unit which calculates a target bit rate for a picture subsequent to the picture of interest by adding a current target bit rate to the corrected bit rate calculated by the encoding distortion bit rate conversion unit, and sets, into the encoding unit, the calculated target bit rate as the encoding parameter for the picture subsequent to the picture of interest.

2. The moving image encoding apparatus according to claim 1, wherein the setting unit performs a setting by referring to a table that indicates the association between a scene encoding distortion amount and an image quality level designated by the user.

3. The moving image encoding apparatus according to claim 1, wherein the scene encoding distortion amount calculation unit calculates an average of the picture distortion amounts in the GOP as the scene encoding distortion amount.

4. The moving image encoding apparatus according to claim 1, wherein the target bit rate calculation unit clips the calculated target bit rate to within a range that is defined by a maximum bit rate and a minimum bit rate that are set in advance.

5. The moving image encoding apparatus according to claim 1, wherein the scene encoding distortion amount calculation unit calculates a scene encoding distortion amount for each picture type to be encoded.

6. A method for controlling a moving image encoding apparatus that encodes pictures that are continuously inputted, the method comprising:
- an encoding step of encoding the inputted pictures block by block according to a given encoding parameter to generate encoded data, the block being configured of a plurality of pixels;
- a decoding step of decoding encoded data obtained from a picture of interest;
- a distortion amount calculation step of calculating a difference in a boundary position between the blocks between a picture obtained through decoding in the decoding step and a picture before being encoded as a picture distortion amount;
- a scene encoding distortion amount calculation step of calculating a scene encoding distortion amount for a group of pictures (GOP) from the picture distortion amounts of pictures in the GOP that includes at least one intra-picture and has been previously encoded;
- a setting step of setting a target distortion amount based on an image quality level that is designated by that a user operates a predetermined operation unit and information in which the relationship between the target distortion amount and the image quality level is described as a target image quality;
- an encoding distortion bit rate conversion step of calculating a corrected bit rate by calculating a difference between the target distortion amount set by said setting step and the scene encoding distortion amount calculated in the scene encoding distortion amount calculation step, and multiplying the calculated difference by an encoding distortion bit rate conversion coefficient; and
- a target bit rate calculation step of calculating a target bit rate for a picture subsequent to the picture of interest by adding a current target bit rate to the corrected bit rate calculated in the encoding distortion bit rate conversion step, and setting the calculated target bit rate as the encoding parameter for the picture subsequent to the picture of interest.

7. A non-transitory computer-readable storage medium storing a computer program which causes a computer to function as the moving image encoding apparatus according to claim 1 by being loaded and executed by the computer.

* * * * *